Patented Aug. 18, 1942

2,293,164

UNITED STATES PATENT OFFICE 2,293,164

PLASTIC RESIN COMPOSITION

Frederick J. Myers, Philadelphia, Pa., assignor to The Resinous Products & Chemical Company, Philadelphia, Pa.

No Drawing. Application August 1, 1939, Serial No. 287,698

10 Claims. (Cl. 260—21)

This invention relates to a method of producing plastic masses and dispersions thereof. It concerns in particular rubbery, elastic compositions which are non-reactive, non-oxidizing, heat-nonconvertible, and essentially infusible and which comprise reaction products of urea-formaldehyde-alcohol condensates and oil-modified, non-drying condensates of a polyhydric alcohol and dibasic acid.

Compositions containing urea-formaldehyde condensates and modified urea-formaldehyde condensates which have heretofore been available are thermosetting or drying preparations which are impractical for the applications for which the new plastic composition disclosed herein will serve. Mixtures of urea-formaldehyde with a resin made from a polyhydric alcohol and a resin-forming acid have been utilized only in the soluble, reactive form, which requires heating or oxidizing to render them insoluble. This precludes their use in many applications, such as on organic materials like paper and leather, which are damaged by the temperatures required for setting the previously known compositions.

An object of this invention is to provide new plastic masses or compositions comprising the reaction product of urea-formaldehyde-alcohol condensates and oil-modified, non-drying, alkyd-type resins. Another object is to make available plastic, essentially infusible compositions which may be applied to organic materials without the use of organic solvent. It is also an object to make available plastic compositions which may be applied to organic materials without necessity for thermosetting or drying conditions. A further object is the provision of heat-nonconvertible, non-reactive, resinous materials which may be varied in other properties such as hardness, tackiness, gloss, fullness, etc. Further objects are to provide a means of coating absorbent and fibrous materials with a minimum of penetration and to provide a method for producing glossy surfaces on absorbent material.

These objects are accomplished by preparing a non-drying, oil-modified, alkyd-type resin and a hydrocarbon-soluble urea-formaldehyde-alcohol condensate, mixing mechanically said resin and said condensate, adding "modifying agents" if so desired, mechanically working and simultaneously heating to insolubilize the mixture, whereby an essentially infusible, heat-nonconvertible, non-reactive, resinous composition with limited thermoplasticity is obtained which is highly condensed and polymerized.

The alkyl-type resins which are used are made from non-oxidizing fatty acids or oils, such as lauric, myristic, stearic, oleic, ricinoleic, etc. acids, or cocoanut oil, cottonseed oil, castor oil, etc.; polyhydric alcohols, such as glycerol, ethylene glycol, polyethylene glycol, pentaerythritol, sorbitol, mannitol, and the like; and dibasic acids, such as phthalic, maleic, succinic adipic, sebacic, etc. or polybasic acids, such as citric acid. Mixtures of various members of these classes of ingredients may also be used. Also, there may be incorporated up to about six per cent. of a drying oil, such as sunflower, soya bean, hemp, linseed, or tung oil or the drying acids derived therefrom. While alkyd-type resins are normally soluble in organic solvents, they substantially lose this property when worked mechanically and simultaneously heated at elevated temperature with 5% or more of their weight of urea-formaldehyde-alcohol condensates. Or, if it is so desired, the alkyd-type resin may be heated until highly polymerized and only slightly soluble before being mixed and reacted with the urea-formaldehyde-alcohol condensate.

The urea-formaldehyde-alcohol condensates which are effective in producing the new plastic masses herein disclosed are prepared by reacting urea and formaldehyde in the presence of an alcohol, preferably a monohydric alcohol such as butanol or ethyl alcohol. A method of carrying out this reaction in the presence of an acid catalyst is shown in U. S. Patent No. 1,633,337 issued June 21, 1927, and U. S. Patent No. 2,019,-865 issued November 5, 1935. Another method is shown in Application Serial No. 139,919 filed April 30, 1937, now U. S. Patent No. 2,171,882, in which the initial condensation is performed in aqueous solution, the water is removed, and the condensation then continued in the presence of an alcohol. These condensates of urea, formaldehyde, and alcohol are not water-soluble, but hydrocarbon-soluble. They are preferably used in the form of viscous solutions containing excess of the alcohol with which they were reacted. Since part of the alcohol is combined with the urea-formaldehyde condensate, these condensates have certain properties which are distinct from those of methylol urea and dimethylol urea.

A theoretical explanation to account, at least in part, for the formation and properties of the new plastic resin compositions herein disclosed may be based upon the presence of ether groups in the urea-formaldehyde-alcohol reaction product. It is known that the alcoholic residue in this reaction product may be replaced by alcoholysis. It is possible that this type of reaction may occur between the urea-formaldehyde-alcohol reaction product and the alkyd resin, which possesses hydroxyl groups.

The various modifying agents which may be added assist in varying the properties of the plastic mass to meet any particular application. Hard resin, such as natural resins, ester gums, oil-soluble phenol-formaldehyde condensates, and maleic anhydride-rosin condensates, are useful in overcoming tackiness, imparting hardness, gloss, and fullness, supplying plasticity, and acting as extenders. Plasticizers, such as butyl phthalate, tricresyl phosphate, ethyl citrate, poly-alcohol-adipic acid or sebacic acid condensates, sulfonamide resins, blown or oxidized castor oil, etc. may also be added to accentuate softness, tackiness, stickiness, etc. although the films formed from compositions containing relatively large amounts of these plasticizers may be weakened. Waxes are helpful in removing "tack," giving good "slip," providing smoother surfaces, and making more workable films, as for calender finishes. Suitable waxes are candelilla, carnauba, paraffin, montan, etc. Metallic soaps, such as aluminum, calcium, or zinc stearates or palmitates, and the like, help provide slip, permit smooth calendering operations, increase water-resistance, etc. Pigments, starch, casein, gums and the like may also be added as modifying agents of the aqueous dispersions of these plastic masses.

The term "modifying agents" as used herein defines those materials incorporated with the urea-formaldehyde-alcohol, alkyd resin reaction product in minor amount to control the superficial properties of the resulting mixture, but still allow the employment of the basic, fundamental properties of the reaction products, as will be further described. They include hard resins, plasticizers, waxes, metallic soaps, oils, pigments, gums, etc.

The proportions of the various materials which may be incorporated may be widely varied and depend upon the particular materials chosen and the properties desired in the finished composition. The ratio of urea-formaldehyde-alcohol condensate to non-drying alkyd may vary from 1:1 to 1:20 although a ratio between 1:1 and 1:10 is preferred. In general the modifying agents must constitute less than half of the final product. Over 50% of modifying agents overcomes the advantages of the reaction product of the two basic materials. The plasticizers should be present, if used, in amounts not exceeding about 30% of the final product. The waxes or metallic soaps are preferably kept below 5%.

In heating the materials together no extraneous catalyst need be added, although the use of catalysts to insolubilize the resins is not precluded. Heating of the mixture with mechanical working is carried on in the range 120–180° C. until the mass becomes homogeneous. A treating period of about 15 minutes to several hours is required. The reaction may be performed in any suitable container which is equipped with a stirrer. A Werner-Pfleiderer mixer or other type of kneading machine is to be preferred. The product obtained from the mixing and heating varies from a coarse, granular powder to a tough, rubbery, sticky mass resembling linoxyn, depending upon the choice and proportion of materials. These products can be worked on a rubber mill and formed into sheets or films. They may be mixed with fillers such as wood flour, cork, asbestos, etc. to serve as binders in molding compositions.

The reaction products may also be mixed with dispersing agents and/or protective colloids to give aqueous dispersions. Fatty acid soaps, particularly amine soaps, such as triethanolamine oleate or triethanolamine ricinoleate, sulfated alcohols, sulfonated ethers, sulfonated amide derivatives, and similar compounds, are effective dispersing and wetting agents. While dispersions obtained with these agents are usually satisfactory as to particle size when the dispersions are freshly prepared, it is generally necessary to add a protective colloid such as casein, gelatin, soya bean protein, a gum such as arabic, karaya or tragacanth, water-soluble cellulose ethers, such as methyl cellulose, or a similar material to stabilize the dispersion over a period of time. Some materials, like casein, act as both a dispersing agent and protective agent.

Dispersions are preferably made in kneading or mixing machines or on roller mills. Such dispersions may be further refined, if desired, by passage through a colloid mill. In preparing dispersions from the harder, plastic masses it is helpful to soften the mass with a small amount of a solvent such as toluene, even though the mass after conversion of the resins is not truly soluble in organic solvents.

The dispersions may be applied by dipping, spraying, roller coating, etc. Special apparatus, solvent recovery systems, and curing equipment are not needed. When dispersions are deposited on any given surface, a thin, adherent film results by dehydration. The film is only more or less continuous and differs considerably from the films obtained from a varnish or lacquer in this respect. It may be rendered more nearly impervious by mechanical treatment, as by calendering, particularly with heat. Calendering may also be used to increase gloss, water-resistance, grease-resistance, and permeability to vapors.

The plastic materials herein described may be pigmented when so desired. Likewise, pigments may be incorporated in the aqueous dispersions. The dispersions may be used in conjunction with such coating materials as starch or casein to improve flexibility and, in the case of starch, to increase resistance to grease.

*Example 1*

Seven hundred fifty parts of an alkyd resin prepared by the interaction of 66 parts of sebacic acid, 66 parts of phthalic anhydride, 138 parts of castor oil, and 49.6 parts of glycerine at 200° C. until an acid number of 35 is reached, is further polymerized by heating to 180° C. for two to three hours until the material gels. The resin is then transferred to a suitable kneading machine which is capable of being heated, and 350 parts of a hard resin, such as is prepared by reacting 500 parts of gum rosin, 67 parts of maleic anhydride, and 73 parts of glycerol at 250–260° C. until the acid number is 35, is added, followed by the addition of 35 parts of candelilla wax. The mass is heated to 150–170° C. and, during agitation, the hard resin disperses and the mix becomes homogeneous. It is cooled to 90° C. and 300 parts of a 60% butanol solution of a hydrocarbon-soluble urea-formaldehyde-butanol reaction product is added. Heating to 140–145° C. for 15–30 minutes with constant agitation effects insolubilization of the resinous mass, and the product is obtained as a granular powder. The resin can be formed into sheets, films, etc. on rubber rolls.

Example 2

One hundred parts of phthalic anhydride, 107.2 parts of castor oil, and 62.5 parts of glycerine are reacted at 200-210° C. until an acid number of 5-15 is reached. 337.5 parts of the alkyd prepared in this manner is heated to 110° C. with 30 parts of rosin ester, and agitated until the rosin ester dissolves. The mass is cooled to 90° C. and 22.5 parts of a 60% butanol solution of a hydrocarbon-soluble urea-formaldehyde-butanol reaction product is added. The mixture is then kneaded in a Werner-Pfleiderer mixer and heated to 140° C. for one-half hour. The finished product is a soft, permanently tacky, flexible resin. Emulsification of this resin is carried out in the following manner: 15.6 parts of casein, 7.8 parts of triethanolamine oleate, and 10.61 parts of concentrated ammonium hydroxide are made into a thick paste with 140.4 parts of water. To this paste, with suitable agitation, 330 parts of the above resin is added slowly. When the dispersion is complete, the paste is diluted slowly with 95 parts of water. The resin emulsion, as described, is useful as an adhesive. In addition, it finds application in the textile industries.

Example 3

Six hundred fifty-five parts of blown castor oil, 450 parts of the rosin-maleic anhydride-glycerine resin described in Example 1, and 45 parts of candelilla wax are charged to a kneading machine and heated to 140-150° C. until the hard resin dissolves. The temperature of the mix is decreased to 90° C. and 400 parts of a 60% butanol solution of a hydrocarbon-soluble urea-formaldehyde-butanol reaction product is added. The temperature of the mixture is then raised to 145° C. and mixing is continued for 15 minutes at this temperature while the resins react. The final product is a tough, rubbery, slightly tacky mass. This material may be sheeted on a rubber mill, or mechanically worked in similar fashion. An aqueous dispersion of the above product may be obtained in the following manner: 600 parts of the resin is placed on the rubber mill and sheeted out. A paste of 30 parts of casein, 15 parts of triethanolamine oleate, and 15 parts of concentrated ammonium hydroxide in 270 parts of water is slowly added to the resin on the rolls. Approximately 100 parts of water is slowly added on the rolls, and after milling for one and a half to two hours, the paste is transferred to a mixer and diluted with 470 parts of water and 7.5 parts of concentrated ammonium hydroxide. The dispersion may be used as a protective or decorative finish, pigmented or clear, for paper, textiles, leather, metal foil, etc.

Example 4

Five hundred parts of an alkyd resin prepared by heating 108 parts of stearic acid, 80 parts of glycerine, 120 parts of phthalic anhydride and 3 parts of maleic anhydride, at 210-220° C. to an acid number of 5-10, 500 parts of blown castor oil and 450 parts of the rosin-maleic-anhydride-glycerine resin (described in Example 1) are charged to a kneading machine and heated to 145-150° C. to effect solution of the hard resin. The charge is cooled to 90° C. and 400 parts of a 60% butanol solution of a hydrocarbon-soluble urea-formaldehyde-butanol reaction product is added. The temperature is increased to 140-145° C. and mixing continued until the resinous mass is homogeneous and essentially insoluble. The product is obtained as a tack-free, light yellow, thermoplastic powder which can be shaped or sheeted on the rubber rolls, etc. An aqueous dispersion of the above-described product may be prepared in the following manner: 600 parts of the resin are sheeted out on the rubber rolls, and 90 parts of an aliphatic hydrocarbon solvent (boiling range 150-200° C.) is incorporated. To this colloidal gel is slowly added a paste comprised of 30 parts of casein, 15 parts of triethanolamine oleate, 15 parts of concentrated ammonium hydroxide in 170 parts of water. When the paste has become thoroughly dispersed throughout the resin, 100-150 parts of water is slowly added. After milling on the rolls for one to two hours, the paste is transferred to a kneading machine and diluted with water to the desired solids content. The product in clear or pigmented form is useful as a finish for fabrics, such as paper or textiles. It exhibits excellent flexibility, freedom from tack, and is water- and grease-resistant.

The non-heatsetting, essentially infusible, non-reactive, rubbery, elastic, tough compositions obtained by the procedure shown are capable of the many modifications which have been described above and are, therefore, useful under many conditions. They find application as protective or decorative coatings on paper, wood, cardboard, foils, composition sheets from compressed fibers or plaster, washable wallpapers, etc. They also serve as adhesives which are not dissolved by water or solvents.

They possess numerous advantages over previous coating materials. For example, since no curing, baking, or air-oxidation is required after application, they may be used for covering materials such as paper or leather which are sensitive to high temperatures. Since the materials can be prepared solvent-free or essentially so, the expense and hazard of solvents is avoided. Odors from solvents are eliminated, an important consideration in finishing packages for foods. If used as dispersions, they are quickly freed from water. The aqueous dispersions, when formulated as described with wetting agents, wet and cover any type of surface, whether hydrophobic or hydrophilic. Penetration of porous surfaces is not a problem, as it is with lacquers or gels in organic solvents. Flexibility of coatings made with non-drying, alkyd-type resins and urea-formaldehyde-alcohol condensates is superior to hot-melt coatings. The compositions herein disclosed may, therefore, be applied with advantage to any fibrous sheet irrespective of its absorbency to secure surface coating. They are also of definite value in coating non-porous materials such as metal foils, where tough, plastic films are required.

I claim:

1. A process for preparing a rubbery, infusible, plastic composition as an aqueous dispersion which comprises mechanically working and simultaneously heating together between 120 and 180° C. a non-oxidizing, oil-modified, alkyd-type resin and a hydrocarbon-soluble, urea-formaldehyde-alcohol condensate with an excess of its alcohol until said resin and said condensate react to yield a mass which is homogeneous and substantially insoluble in organic solvents, and incorporating with agitation a dispersing agent, a protective colloid, and water therewith.

2. A process for preparing a rubbery, infusible, plastic composition which comprises mechanically working together a non-oxidizing, oil-modified, alkyd-type resin, a hydrocarbon-soluble, urea-formaldehyde-alcohol condensate with an excess of its alcohol, and a modifying agent, and simultaneously heating the mixture between 120 to 180° C. until said resin and said condensate react to yield a mass which is homogeneous and substantially insoluble in organic solvents.

3. A process for preparing a rubbery, flexible, infusible, plastic mass which comprises mechanically working together a non-oxidizing, non-drying, oil-modified alkyd resin and a hydrocarbon-soluble urea-formaldehyde-alcohol condensate dissolved in an excess of its alcohol, and simultaneously heating the mixture between about 120° C. and about 180° C. until said resin and said condensate react to yield a homogeneous mass which is substantially insoluble in organic solvents.

4. A homogeneous, heat-nonconvertible, highly condensed and polymerized, infusible, rubbery, flexible, plastic mass with limited thermoplasticity which comprises the reaction product obtained by mechanically working and simultaneously heating between about 120° C. to about 180° C. an oil-modified, non-oxidizing, alkyd resin and a hydrocarbon-soluble, urea-formaldehyde-alcohol condensate with an excess of its alcohol.

5. A homogeneous, heat-nonconvertible, highly condensed and polymerized, infusible, rubbery, flexible, plastic mass with limited thermoplasticity which comprises the reaction product obtained by mechanically working and simultaneously heating between about 120° C. and about 180° C. an oil-modified, non-oxidizing, alkyd resin and a hydrocarbon-soluble, urea-formaldehyde-alcohol condensate with an excess of its alcohol and a modifying agent.

6. A homogeneous, heat-nonconvertible, highly condensed and polymerized, infusible, rubbery, flexible, plastic mass with limited thermoplasticity which comprises the reaction product obtained by mechanically working and simultaneously heating between about 120° C. and about 180° C. an oil-modified, non-oxidizing, alkyd resin and a hydrocarbon-soluble, urea-formaldehyde-alcohol condensate with an excess of its alcohol and an extending hard resin.

7. A homogeneous, heat-nonconvertible, highly condensed and polymerized, infusible, rubbery, flexible, plastic mass with limited thermoplasticity which comprises the reaction product obtained by mechanically working and simultaneously heating between about 120° C. and about 180° C. an oil-modified, non-oxidizing, alkyd resin and a hydrocarbon-soluble, urea-formaldehyde-alcohol condensate with an excess of its alcohol and a plasticizing agent.

8. A homogeneous, heat-nonconvertible, highly condensed and polymerized, infusible, rubbery, flexible, plastic mass with limited thermoplasticity which comprises the reaction product obtained by mechanically working and simultaneously heating between about 120° C. and about 180° C. an oil-modified, non-oxidizing alkyd resin and a hydrocarbon-soluble, urea-formaldehyde-alcohol condensate with an excess of its alcohol and blown castor oil.

9. An aqueous resin dispersion which comprises water, a protective colloid and the non-reactive, highly condensed and polymerized infusible, heat-nonconvertible, rubbery, flexible, plastic reaction product obtained by mechanically working and simultaneously heating between about 120° C. and about 180° C. until homogeneous a mixture comprising a non-oxidizing, oil-modified, alkyd-type resin, and a hydrocarbon-soluble urea - formaldehyde-alcohol condensate with an excess of its alcohol.

10. An aqueous dispersion of a non-reactive, infusible, heat-nonconvertible, highly condensed and polymerized, flexible, rubbery, plastic mass of limited thermoplasticity consisting essentially of the relatively insoluble reaction product obtained by mechanically working and simultaneously heating between about 120° C. and about 180° C. until homogeneous a non-oxidizing, oil-modified, alkyd-type resin, a hydrocarbon-soluble urea-formaldehyde-alcohol condensate with an excess of its alcohol, and a modifying agent, said mass being dispersed in water with a protective colloid.

FREDERICK J. MYERS.